Figure 1:
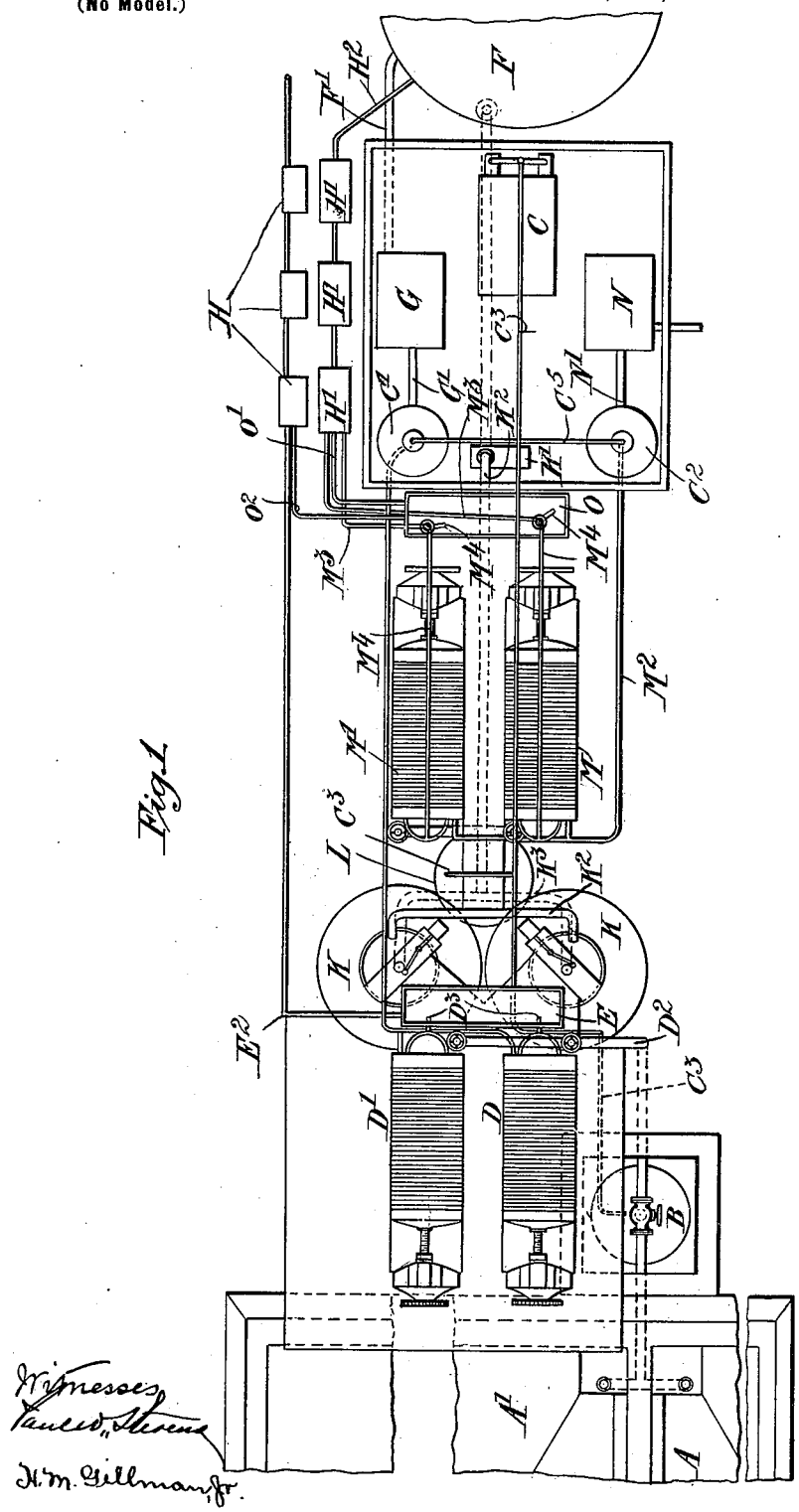

No. 652,849. Patented July 3, 1900.
S. H. JOHNSON & H. L. SULMAN.
PROCESS OF EXTRACTING METALS FROM ORES OR SLIMES.
(Application filed Dec. 11, 1899.)
(No Model.) 3 Sheets—Sheet 1.

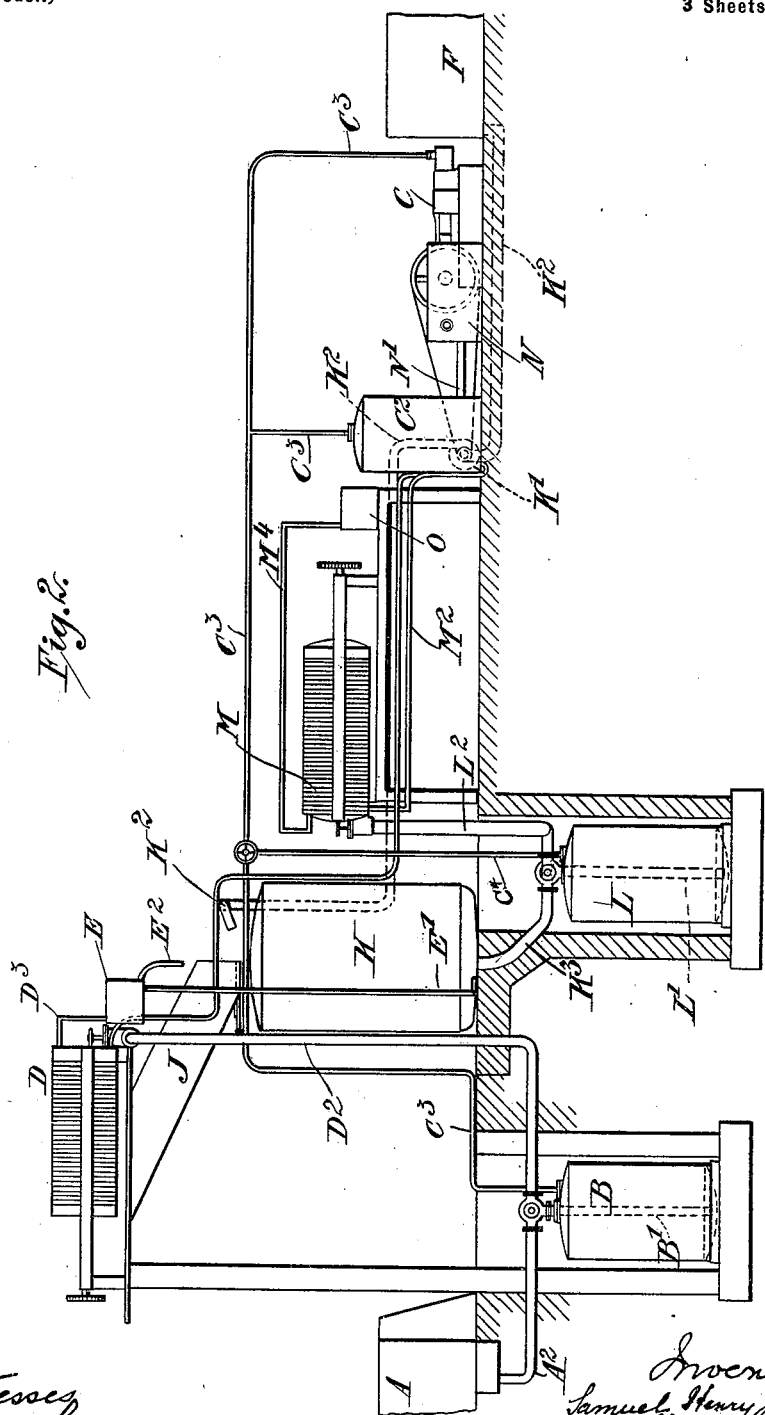

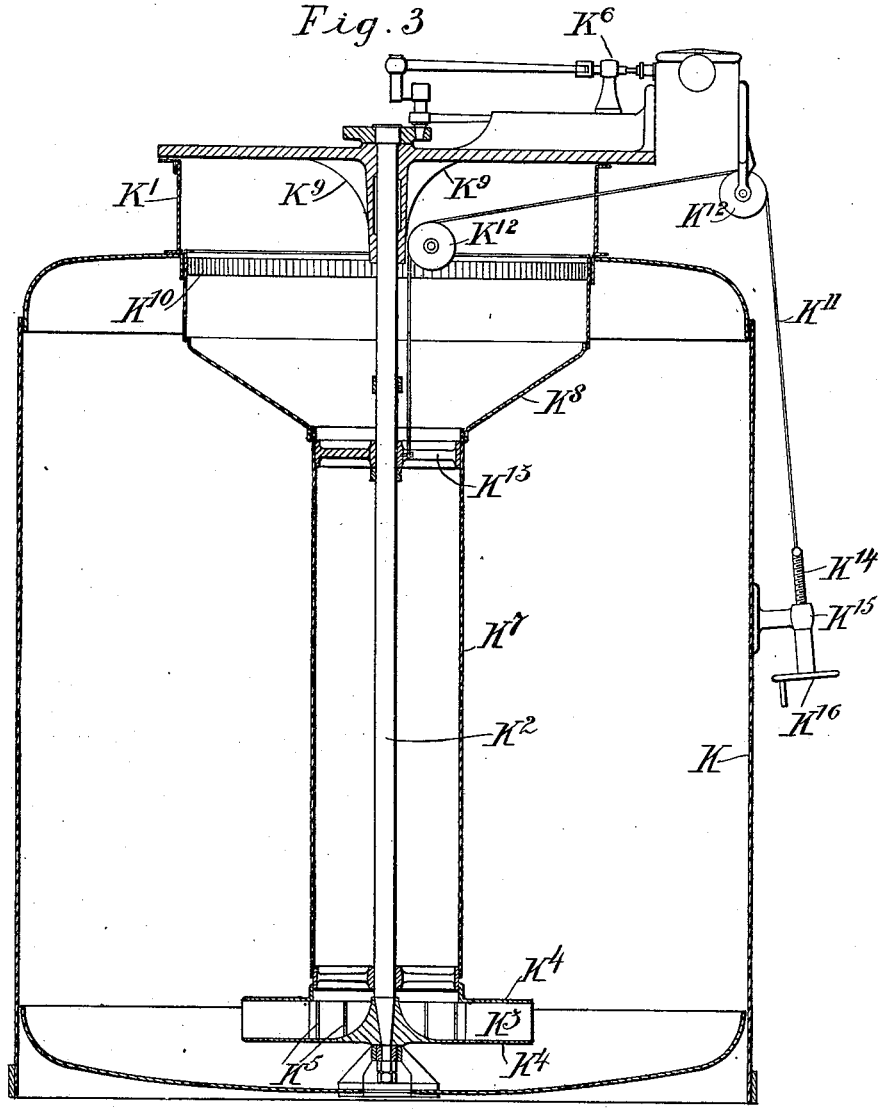

UNITED STATES PATENT OFFICE.

SAMUEL HENRY JOHNSON AND HENRY LIVINGSTONE SULMAN, OF LONDON, ENGLAND, ASSIGNORS TO THE S. H. JOHNSON & COMPANY, LIMITED, OF SAME PLACE.

PROCESS OF EXTRACTING METALS FROM ORES OR SLIMES.

SPECIFICATION forming part of Letters Patent No. 652,849, dated July 3, 1900.

Application filed December 11, 1899. Serial No. 740,003. (No specimens.)

*To all whom it may concern:*

Be it known that we, SAMUEL HENRY JOHNSON, residing at Stratford, London, county of Essex, and HENRY LIVINGSTONE SULMAN, residing at London, England, subjects of the Queen of England, have invented certain new and useful Improvements in or Relating to the Extraction of Metals from Ores or Slimes, of which the following is a specification.

This invention relates to the extraction of metals from ores or slimes, and has for its object the removal of gold and other metals from finely-divided minerals or from slimes by chemical treatment in the wet process. The invention has particular reference to processes employing filter-presses for leaching the finely-divided ores or slimes, and is applicable, for instance, to such a process as is described in the specification of British Letters Patent No. 19,389 of 1891.

Finely-divided precipitated ores—such, for example, as the settled slimes which precipitate from the battery-tailings—contain a large amount of water, the proportion in some cases being about five parts, by volume, of dry solid to fifteen parts, by volume, of water. In treating such material with chemical solutions—such, for instance, as a solution of cyanid of potassium—the water present obviously tends to dilute the solution used, and consequently a greater waste of the chemicals must occur in the extraction of the metal than would be the case if the water were not present. By the employment of filter-presses a considerable proportion of the water in the material may be expressed. It is found that by this preliminary filter-pressing twenty parts, by volume, of settled slime yield about eight parts, by volume, of filter-pressed cake and twelve parts, by volume, of filtrate, thus leaving behind in the cake five parts, by volume, of dry solid and three parts of water.

An important feature of this invention is the elimination of the water which remains in the pressed material in such a manner as to avoid the expense of driving off such water by heat, thus permitting of the treatment of wet or battery crushed ores and ore products with the same economy as can be effected with dry materials. This is accomplished by displacing the water remaining in the cakes after the preliminary filter-pressing by means of a cyanid or other chemical solution of normal strength. If precautions are taken in the pressing so that the cakes produced are uniformly permeable, the whole of the remaining water may be displaced by our process with only a very slight admixture of the chemical solution used. Owing to the fact that the displaced water contains a small amount of the solvent solution it will in the case of gold slimes contain some gold, and it is desirable in order to recover this gold without diluting the bulk of the main body of solvent liquor to employ a small set of zinc boxes, zinc cones, or other convenient apparatus, the overflow from which may be allowed to run to waste. The main volume of the working solvent liquor is treated in another precipitating apparatus, as hereinafter described. For the purpose of correctly gaging the volume of liquid displaced from the cakes a graduated tank is employed, and when the effluent displaced from the cakes in the filter-press is equal to the volume of water that those cakes originally contained, the amount of such volume being determined in any particular case by a preliminary assay, the process of displacement is considered to be complete. By thus removing a volume of liquid equal to the volume of the water contained in the cakes after the preliminary compression it follows that no practical alteration will take place in the volume of the main bulk of solvent liquor subsequently employed in extracting the metal from the pressed material. The cakes from which the moisture has been displaced by means of normal solvent liquor in the filter-pressing operations above described are then mechanically broken up and agitated with a sufficient quantity of normal solvent solution to bring them into a sufficiently-liquid condition to admit of their being readily treated with the solvents; but the mixture should not be made so liquid that the solid matter in suspension would readily settle therefrom. The amount of liquid required would be from once to twice the volume of the cake or more, depending upon the relative facilities of different ores for remaining in suspension in the liquid, the object being that there shall be sufficient mobility in the liquid to admit of speedy solution of the precious metals and at the same time that there shall not be any tendency for the solids to settle out of the liquid in the chambers of the filter-press during the period of charging or in the other operations, as such settlement would tend to produce cakes which would not be uniformly permeable—a condition which should be carefully guarded against. The best state of dilution may be easily determined upon for any particular ore by any one of experience and skill in such matters.

To insure the rapid solution of the metals and also that the solids shall be suspended in the liquor, so as to form a homogeneous magma suitable for working properly in the filter-presses, an improved mixing apparatus is employed, which is hereinafter more fully described. It is to be understood, however, that this particular form of mixing apparatus is not absolutely essential to the carrying out of our process. Other convenient apparatus may be employed. After the material has been thoroughly mixed with the additional quantity of normal solvent solution it is treated in leaching filter-presses, and a large proportion of the liquid which now contains the metal in solution is squeezed out and allowed to flow directly to the zinc boxes or other apparatus where the gold or other metal is precipitated. After leaving this apparatus the liquid is returned to the strong-liquor tank. Some of the metal-bearing solution will remain in the cakes in the filter-press, and this is now displaced by means of water, the volume displaced being gaged, as in the first part of the process, so that dilution of the solvent liquid is avoided. The displaced liquid is treated in the precipitating apparatus and is then returned to the strong-liquor tank. The washing is continued for the purpose of finally removing all traces of gold in solution from the cakes, and these washings are collected and are passed through a separate precipitating apparatus, from which the liquid may be allowed to run to waste.

It will be seen that the process according to this invention may be summarized by stating that after a preliminary treatment of the material in a filter-press the water remaining in the cakes is displaced by a normal solvent solution, the material being then further mixed with the solvent solution and again treated in a filter-press, by means of which the metal-bearing liquid is removed partly by expression and finally by displacing it with water, the whole of these operations being conducted so that an approximately-constant volume of the solvent solution is maintained.

In the accompanying drawings, which illustrate diagrammatically one construction of apparatus for carrying out the improved process, Figure 1 is a plan, Fig. 2 is a side elevation, and Fig. 3 a central vertical section, of the mixing apparatus to a larger scale.

Like letters indicate like parts throughout the drawings.

A and A' are settling-tanks through which the liquid containing the finely-divided ore may flow continuously, the slimes being deposited by gravitation. From the settling-tanks the slime passes by means of a pipe $A^2$ to a forcing-receiver B, which is supplied with compressed air through a pipe $C^3$, communicating with compressed-air reservoirs C' and $C^2$, these reservoirs being supplied from an air-compressor C. Preferably the forcing-receiver is arranged so that when the pressure of air is removed the receiver automatically refills the semiliquid slimes by gravitation from the settling-tanks A and A'.

D and D' are filter-presses used for the elimination of the water from the slime, which is supplied to them through the pipe $D^2$, being forced up through the pipes B' and $D^2$ by compressed air.

The greater part of the water in the slime is expressed in the filter-presses D and D' and passes through a pipe $D^3$ to a tank E and thence to waste by a pipe E'. The residual water in the cakes is then displaced or "pushed out" by means of solvent solution of normal strength, which is pumped from a liquor-tank F through a pipe F' by a pump G. The delivery-pump G' of the pump G communicates with the bottom of the compressed-air reservoir C', and another pipe $G^2$ leads from the same portion of that reservoir to the filter-presses D and D'.

The tank E is preferably gaged so that a calculated quantity of water may be displaced by the solvent solution, and when this operation has been performed, as the displaced water may contain a small quantity of the solvent, it is passed through a pipe $E^2$ to a small set of zinc boxes H or other convenient precipitating devices. After leaving the zinc boxes the liquid may be allowed to run to waste. Beneath the filter-presses D and D' is a chute J, into which the compressed cakes fall and are conveyed to a mixing apparatus K, hereinafter more fully described. The material while in the mixer K has an additional quantity of normal solvent solution added to it, this solution being pumped by a pump K' through pipes $K^2$ from the liquor-tank F. It is found that a convenient quantity of the solvent is an amount which is approximately equal to the volume of water mechanically expressed from the slime in the filter-presses D and D'. After being thoroughly mixed with the solvent in the apparatus K the material passes through a pipe $K^3$ to a second forcing-receiver L. This forcing-receiver L is supplied with compressed air from the reservoirs C' $C^2$ through a pipe $C^4$, and the material is forced up through the pipes L' and $L^2$ to a second set of filter-presses M and M'. In these presses M and M' the material is first compressed to extract the more easily removable solvent solution, (now the metal-bearing liquid,) and then the remaining portion of the liquid is displaced by means of water, which is forced into the presses M M' through a pipe M² by means of compressed air from the reservoir C². The water is supplied to the reservoir C² by means of a pump N, the delivery-pipe N' of which communicates with the bottom of the reservoir. The expressed metal-bearing liquid is passed to a separate set of zinc boxes H' or other convenient precipitating devices through a pipe M³, from whence it passes by a pipe H² to the liquor-tank F. The displaced metal-bearing liquid passes through a pipe M⁴ to a graduated tank O and thence through a pipe O' to the precipitating devices H'. After the calculated volume of solvent has been displaced by the water under pressure more water is forced through the cakes in the presses M M' in order to remove the last traces of metal-bearing liquid. This liquid also passes into the tank O, but owing to its weak condition is not allowed to pass to the precipitating devices H', but is passed through a pipe O² to the small zinc boxes H, from whence the liquid may be allowed to run to waste.

It will be noticed that the air-reservoirs C' and C² communicate by a pipe C⁵, and thus the air-pressure upon the solvent solution and the washing-water is equalized.

Fig. 3 illustrates in vertical section an improved form of mixing device which is found to be extremely efficient. The general principle upon which this device works is similar to that described in the specification of British Letters Patent No. 5,377 of 1892, and the present mixer constitutes an improvement upon the machines therein mentioned. The improved mixing apparatus comprises a vessel K, having a neck K' and provided with a vertical shaft K², suitably journaled at the bottom of the vessel. This shaft K² carries a vane K³, which is formed with two disks K⁴, having between them ribs K⁵, which are curved or partly radial and partly curved, so that they act upon the liquid in the tank in a way similar to the action of a centrifugal pump. The shaft K² is driven by a small engine K⁶, which is mounted upon the neck of the vessel K. Surrounding the shaft K², within the vessel K, is a trunk-pipe K⁷, which does not rotate, and at the top of this conducting or trunk pipe K⁷ a hopper K⁸ is provided, the mouth of which is only slightly smaller than the contracted neck K' of the vessel K. The top of the tank is so shaped that it tends to cause the flow of liquid delivered from the centrifugal vane K³ to converge toward and overflow the rim of the hopper K⁸ in the form of a cascade. The object of causing the liquid to enter the hopper in this cascade is to secure the efficient oxidation of the liquid, when such is desirable, by atmospheric aeration. This effect is further increased by providing the top of the hopper K⁸ with a rim or band K¹⁰, which is perforated or provided with slots, such slots being preferably made without removing the metal—merely slitting it, so as to form small flaps. Through these perforations or slots the liquid under agitation is delivered in cascade form into the hopper K⁸.

In order to enable the mixing apparatus to work efficiently, even when it is not quite full, the circulating or trunk pipe K⁷ is arranged so that it is capable of sliding up for a short distance upon the shaft K². This allows the liquid to flow into the vane K³, between the trunk-pipe K⁷ and the top of the vane, thus securing a thorough circulation and agitation at the bottom of the vessel K. The movement of the trunk-pipe K⁷ is effected by means of a cord or equivalent K¹¹, which passes over two pulleys K¹² and is fixed to a support or spider K¹³ at the top portion of the trunk-pipe K⁷. The other end of the cord K¹¹ is fastened to a screw K¹⁴, which can be screwed in or out of its support K¹⁵ by means of a hand-wheel K¹⁶.

The function of the trunk-pipe K⁷ is to cause the liquid to circulate in a vertical direction, and the pipe K⁷ merely forms a feed-conduit to the centrifugal vane K³ at the bottom of the tank. It will be readily seen that with such a vane in the lower part of the vessel no deposition of fine sands can take place during the mixing operations.

When bromid of cyanogen is used or in other cases where oxidation is undesirable, the hopper K⁸ and the cascading arrangement K¹⁰ may be omitted.

In the apparatus various cocks or valves are placed to control the respective pipes; but these form no part of the present invention and are omitted from the drawings for the sake of clearness.

As hereinbefore stated, it is to be distinctly understood that the apparatus described although forming a convenient means for carrying out this invention is not essential thereto, but may be varied in many ways while still carrying out the improved process.

What we claim as our invention, and desire to secure by Letters Patent, is—

1. The method of treating pressed slime cakes containing residual water, which consists in displacing the residual water in the cakes with a solvent solution.

2. The method of treating ores or slimes, which consists in removing a portion of the water from the ores or slimes by pressure, and then displacing the residual water in the pressed ores or slimes with an equal volume of a solvent solution.

3. The method of treating pressed slime cakes containing residual water, which consists in displacing the residual water with a solvent solution, mixing the cakes with a further quantity of solvent solution, and removing the metal-bearing solvent solution by pressure.

4. The method of treating pressed slime cakes containing residual water, which consists in displacing the residual water with a solvent solution, mixing the cakes with a further quantity of solvent solution, removing the metal-bearing solvent solution by pressure, and displacing the remaining portion of such metal-bearing solution with water.

5. The method of treating pressed slime cakes containing residual water, which consists in displacing the residual water with an equal volume of a solvent solution, mixing the cakes with a further quantity of solvent solution, removing the metal-bearing solvent solution by pressure, displacing the remaining portion of such metal-bearing solution with water, and extracting the metal from said metal-bearing solution, whereby all the operations may be performed with an approximately-constant volume of the solvent solution.

In testimony whereof we have signed our names to this specification in the presence of two subscribing witnesses.

SAMUEL HENRY JOHNSON.
HENRY LIVINGSTONE SULMAN.

Witnesses:
W. M. HARRIS,
FRED. C. HARRES.